United States Patent [19]

Yamanaka et al.

[11] Patent Number: 6,086,987
[45] Date of Patent: Jul. 11, 2000

[54] SYNTHETIC PAPER AND INKJET RECORDING PAPER WITH THE USE OF THE SAME

[75] Inventors: Masaaki Yamanaka; Kazuyuki Kimura; Kazumasa Hirano, all of Ibaraki, Japan

[73] Assignee: Oji-Yuka Synthetic Paper Co., Ltd., Tokyo, Japan

[21] Appl. No.: 09/012,737

[22] Filed: Jan. 23, 1998

[30] Foreign Application Priority Data

Jan. 23, 1997 [JP] Japan .................................. 9-010484
Jan. 28, 1997 [JP] Japan .................................. 9-027336

[51] Int. Cl.⁷ .............................. B32B 5/16; B32B 3/26; B32B 3/06; B32B 27/00
[52] U.S. Cl. ................ 428/330; 428/304.4; 428/307.3; 428/411.1; 428/500; 428/515; 423/419.1; 423/441
[58] Field of Search ..................................... 428/330, 403, 428/357, 402, 404, 407, 304.4, 307.3, 323, 500; 423/419.1, 441

[56] References Cited

U.S. PATENT DOCUMENTS

| | | | |
|---|---|---|---|
| 4,081,583 | 3/1978 | Akiyama et al. ........................ | 428/457 |
| 4,341,880 | 7/1982 | Toyoda et al. ........................... | 524/101 |
| 4,386,965 | 6/1983 | Fringeli et al. .......................... | 106/214 |
| 4,605,591 | 8/1986 | Nose et al. ............................... | 428/332 |
| 4,892,902 | 1/1990 | Shioji et al. ............................. | 524/417 |
| 4,981,748 | 1/1991 | Kawai et al. ............................ | 428/216 |
| 5,000,871 | 3/1991 | Minayoshi et al. ..................... | 252/309 |
| 5,320,897 | 6/1994 | Kondo et al. ........................... | 428/195 |
| 5,489,471 | 2/1996 | Inoue et al. ........................... | 428/304.4 |
| 5,652,326 | 7/1997 | Ueda et al. ............................. | 528/288 |
| 5,670,225 | 9/1997 | Yamananka et al. ................... | 428/40.1 |
| 5,698,627 | 12/1997 | Oguni et al. ............................ | 524/724 |
| 5,747,146 | 5/1998 | Kashiwazaki et al. ................. | 428/206 |
| 5,798,078 | 8/1998 | Myers ..................................... | 264/446 |
| 5,865,951 | 2/1999 | Kawakami et al. .................... | 162/158 |

FOREIGN PATENT DOCUMENTS 0 736 374  10/1996  European Pat. Off. .
0 745 488  12/1996  European Pat. Off. .

OTHER PUBLICATIONS

Chemical Abstracts, vol. 124, No. 8, Feb. 19, 1996, AN 89143y, JP 07 300568, Nov. 14, 1995.

*Primary Examiner*—Paul Thibodeau
*Assistant Examiner*—Sheeba Ahmed
*Attorney, Agent, or Firm*—Oblon, Spivak, McClelland, Maier & Neustadt, P.C.

[57] ABSTRACT

A synthetic paper made of a stretched resin film; said stretched resin film being obtained by stretching a resin film having as a support a resin composition which contains: (A) from 30 to 80% by weight of a crystalline polyolefin resin; and (B) from 70 to 20% by weight of milled calcium carbonate particles at a temperature lower than the melting point of said crystalline polyolefin resin employed as the component (A); and an inkjet recording paper made by using this synthetic paper. Because of having projections of finely milled calcium carbonate particles with a hydrophilic surface around which a number of fine cracks are formed, the synthetic paper shows improved moisture absorptivity for water color inks and aqueous adhesives, quick drying properties and excellent printability.

13 Claims, No Drawings

SYNTHETIC PAPER AND INKJET RECORDING PAPER WITH THE USE OF THE SAME

BACKGROUND OF THE INVENTION

1. Field of the Invention

This invention relates to a synthetic paper made of a stretched polyolefin resin film which is excellent particularly in offset printability and inkjet ink fixing properties and an inkjet recording paper with the use of this synthetic paper.

There have been known synthetic papers made of stretched films comprising as the support crystalline polyolefin resin compositions such as polypropylene and high-density polyethylene containing calcium carbonate powders of 0.8 to 4 μm in average particle size (U.S. Pat. No. 4,341,880, No. 4,340,639 and No. 4,191,719). These synthetic papers have been marketed under the trademarks of "YUPO FPG", "YUPO KPG", "YUPO SGC", etc. from Oji Yuka Koseishi Co., Ltd. and "Polyart II" from BXL in UK.

Calcium carbonate powders employed in these synthetic papers involve: (1) dry-milled heavy calcium carbonate particles having an average particle size of from 1 to 10 μm; (2) those having a desired particle size (0.5 to 1 μm) by sieving or classing the above-mentioned dry-milled particles; (3) synthesized colloidal calcium carbonate particles having a particle size of from 0.03 to 0.2 μm; (4) dry-milled heavy calcium carbonate particles having been surface-treated with metal salts of fatty acids; and (5) calcium carbonate particles carrying dispersant adhered thereto which have been obtained by dispersing calcium carbonate in an aqueous medium with the use of anionic polymer dispersants, wet-milling and then drying.

Since the dry-milled heavy calcium carbonate particles have a large average particle size of 1 μm or above, voids are formed around these particles in the stretched film and, in its turn, cracks appear on the surface of the film. In the step of offset printing, inks filter into these cracks, which causes loss of gloss. Accordingly, these calcium carbonate particles are usable not in high-quality printing such as posters with excellent gloss but exclusively in printing papers for common uses such as greeting cards and books.

When blended with a crystalline polyolefin, the heavy calcium carbonate particles having been surface-treated with metal salts of fatty acids during dry-milling improve the dispersibility but exert no effect of preventing loss of gloss. The calcium carbonate particles obtained by dispersing calcium carbonate particles in an aqueous medium with the use of an anionic dispersant, milling and then drying are hardly usable in synthetic papers, because of the difficulties in milling them into primary particles and the serious secondary aggregation.

On the other hand, light calcium carbonate particles cannot be well dispersed in a crystalline polyolefin resin and frequently undergo aggregation due to the small average particle size thereof (0.2 μm or less). After stretching, these aggregates appear as large projections on the surface of the synthetic papers. Then these projections are separated off from the paper surface and thus cause an image defect called white spots, which disturbs printing with high sharpness (JP-B-6-55549, JP-B-5-51900; the term "JP-B" as used herein means an "examined Japanese patent publication").

Under these circumstances, the present invention aims at providing a paper for offset printing allowing quick drying of inks and suffering from no loss of gloss, a synthetic paper which is suitable for gravure printing, etc., and an inkjet recording paper with the use of this synthetic paper.

SUMMARY OF THE INVENTION

Accordingly, the first invention provides a synthetic paper made of a stretched resin film; said stretched resin film being obtained by stretching a resin film having as a support a resin composition which comprises: (A) from 30 to 80% by weight of said composition of a crystalline polyolefin resin; and (B) from 70 to 20% by weight of said composition of calcium carbonate particles selected from the group consisting of:

(b1) Milled calcium carbonate particles having an average particle size of from 0.3 to 2 μm prepared by wet-milling 100 parts by weight of calcium carbonate particles in an aqueous medium in the presence of from 0.05 to 2 parts by weight of a dispersant comprising a copolymer of from 10 to 95% by mol of an amine salt selected from among diallylamine salts and alkylallylamine salts with from 90 to 5% by mol of an amide selected from among acrylamide and methacrylamide followed by drying; and (b2) Milled calcium carbonate particles having an average particle size of from 0.3 to 2 μm prepared by wet-milling 100 parts by weight of calcium carbonate particles in an aqueous medium in the presence of from 0.05 to 2 parts by weight of a dispersant comprising a copolymer of from 10 to 95% by mol of an amine salt selected from among diallylamine salts and alkylallylamine salts with from 90 to 5% by mol of an amide selected from among acrylamide and methacrylamide and then treating the thus milled product in an aqueous medium with 0.5 to 10 parts by weight of a sulfonate selected from among sulfonates of alkylene oxide adducts of monohydric alcohols, alkylsulfonates and alkylbenzenesulfonates followed by drying; and wherein said stretching is performed at a temperature lower than the melting point of said crystalline polyolefin resin employed as component (A).

The second invention provides an inkjet recording paper made of the synthetic paper of the present invention, such that when a water color ink (100% by weight in total) of the following composition is dropped onto the surface thereof, the contact angle of said water color ink to said recording paper being 20 to 42°:

| C.I. Food Black 2 | 2% by weight, |
|---|---|
| N-methyl-2-pyrrolidone | 10% by weight, |
| diethylene glycol | 20% by weight, |
| polyethylene glycol (m.w.: 200) | 15% by weight, and |
| water | 53% by weight. |

By regulating the average particle size of calcium carbonate particles to 0.3 to 2 μm, the diameter and depth of surface cracks can be controlled so that the ink can be quickly dried while causing no loss of gloss. Since the calcium carbonate particles have a nitrogen-containing cationic polymer as the dispersant adhering onto the surface thereof, the ink can well adhere to the synthetic paper.

DETAILED DESCRIPTION OF THE INVENTION (A) Crystalline polyolefin:

As the crystalline polyolefin employed as the support resin of the synthetic paper, it is preferable to use an α-olefin having a crystallinity (determined by X-ray diffractometry or IR analysis) of from 10 to 75%, preferably from 20 to 75%, and selected from among homopolymers of α-olefins having 2 to 8 carbon atoms (ethylene, propylene, butene-1, hexene-1, heptene-1, octene-1, 4-methyl-pentene-1, 3-methyl-pentene-1, etc.) and random or block copolymers of 2 to 5 α-olefins such as those as cited above.

More particularly speaking, examples of the crystalline polyolefin include branched or linear polyethylene having a density of from 0.890 to 0.970 g/cm³ and a melt flow rate (190° C., load 2.16 kg) of from 0.2 to 50 g/10 min, a propylene homopolymer having a melt flow rate (230° C., load 2.16 kg) of from 0.2 to 50 g/10 min, propylene/ethylene copolymers, propylene/butene-1 copolymers, propylene/ ethylene/butene-1 copolymers, propylene/4-methylpentene-1 copolymers, propylene/3-methylpentene-1 copolymers, propylene/ethylene/3-methylpentene-1 copolymers, polybutene-1, poly(4-methylpentene-1), etc.

Among these polyolefins, it is particularly preferable to use a propylene homopolymer or a high-density polyethylene having a density of from 0.950 to 0.970 g/cm³, since these polyolefins are less expensive and have high crystallinity.

(B) Wet-milled calcium carbonate particles:

The wet-milled calcium carbonate particles of the component (b1) are milled calcium carbonate particles having an average particle size of from 0.3 to 2 μm prepared by wet-milling 100 parts by weight of calcium carbonate particles (particle size: 0.5 to 50 μm) in an aqueous medium in the presence of from 0.05 to 2 parts by weight of a cationic polymer dispersant comprising a copolymer of from 10 to 95% by mol of an amine salt selected from among diallylamine salts and alkylallylamine salts with from 90 to 5% by mol of an amide selected from among acrylamide and methacrylamide followed by drying.

The wet-milled, surface-treated calcium carbonate particles of the component (b2) are milled calcium carbonate particles having an average particle size of from 0.3 to 2 prepared by wet-milling 100 parts by weight of calcium carbonate particles (particle size: 0.5 to 50 μm) in an aqueous medium in the presence of from 0.05 to 2 parts by weight of a dispersant comprising a copolymer of from 10 to 95% by mol of an amine salt selected from among diallylamine salts and alkylallylamine salts with from 90 to 5% by mol of an amide selected from among acrylamide and methacrylamide, drying the milled product and then treating 100 parts by weight of the calcium carbonate in an aqueous medium with 0.5 to 10 parts by weight of an antistatic sulfonate selected from among sulfonates of alkylene oxide adducts of monohydric alcohols, alkylsulfonates and alkylbenzenesulfonates followed by drying.

As the calcium carbonate material for producing the components (b1) and (b2), it is preferable to use heavy calcium carbonate particles which have been dry-milled, classed or sieved.

The water-soluble cationic copolymer employed for dispersing these calcium carbonate particles is a copolymer of from 10 to 95% by mol (preferably from 50 to 80% by mol) of an amine salt (a) selected from among diallylamine salts and alkylallylamine salts with from 90 to 5% by mol (preferably from 50 to 20% by mol) of an amide (b) selected from among acrylamide and methacrylamide.

The alkyldiallylamine salt constituting the dispersant is exemplified by those carrying an alkyl group having 1 to 8 carbon atoms, preferably those carrying an alkyl group having 1 to 4 carbon atoms.

The diallylamine and alkyldiallylamine salts are exemplified by salts of diallylamines and alkyldiallylamines with inorganic acids such as hydrochloric acid, sulfuric acid and nitric acid or organic acids such as acetic acid.

This water-soluble cationic copolymer dispersant may be prepared from a polymerizable amine salt (a) and an amide (b) optionally together with other copolymerizable monomers such as styrene, vinyl acetate, N-vinylpyrrolidone, 2-hydroxyethyl (meth)acrylate, methyl (meth)acrylate, ethyl (meth)acrylate and butyl (meth)acrylate.

The intrinsic viscosity of this cationic copolymer dispersant usually ranges from 0.05 to 3,00, preferably from 0.10 to 1.80 and still preferably from 0.15 to 0.70. The weight-average molecular weight of this dispersant determined by GPC usually ranges from 1,000 to 1,000,000, preferably from 5,000 to 800,000 and still preferably from 10,000 to 700,000. This cationic copolymer dispersant can be prepared in accordance with the method described in JP-A-5-263010 (the term "JP-A" as used herein means an "unexamined published Japanese patent application").

Heavy calcium carbonate is wet-milled in the presence of the above-mentioned cationic copolymer dispersant. More particularly speaking, an aqueous medium (preferably water) is added to the heavy calcium carbonate particles in such a manner as to give a weight ratio of heavy calcium carbonate/aqueous medium of from 70/30 to 30/70, preferably from 60/40 to 40/60. Then the cationic copolymer dispersant is added thereto in an amount of from 0.05 to 2 parts by weight, preferably from 0.1 to 1 parts by weight, in-terms of dry matter per 100 parts by weight of the heavy calcium carbonate. The obtained mixture is then wet-milled in a conventional manner. Alternatively, the cationic copolymer dispersant is preliminarily dissolved in the aqueous medium so as to give the ratio as specified above and then mixed with heavy calcium carbonate followed by wet-milling in the conventional manner. The wet-milling may be performed either batchwise or continuously. It is preferable to use therefor a mill with a milling medium such as a sand mill, an attritor or a ball mill. Thus calcium carbonate particles having an average particle size of 2 μm or less, preferably from 0.3 to 2 μm can be obtained.

Next, the wet-milled product is dried. It is also possible that the wet-milled particles are classed and thus coarse ones (350 mesh-on) are eliminated therefrom prior to drying. Drying may be performed by a known method such as hot-air drying or spray drying. Among all, a fluid medium drying method is preferable therefor. In the fluid medium drying method, a slurry material is fed into a fluidized medium particles (fluidized bed) via a hot-air stream. Then the slurry material thus supplied adheres in a filmy state to the surface of the medium particles fluidized vigorously. Thus the material is dispersed in the fluidized bed and dried by the hot-air stream therein. Thus fluid medium drying may be easily carried out with the use of, for example, a Media Slurry Dryer manufactured by Nara Kikai Seisakusho K.K. It is preferable to use such a medium fluid dryer, since the material can be dried and processed into primary particles at the same time.

By drying the wet-milled slurry by the above-mentioned fluid medium drying method, calcium carbonate particles containing few coarse particles can be obtained. After the completion of the fluid medium drying, however, the particles may be further milled and classed by any desired method. When the wet-milled product is dried not by the fluid medium drying method but by conventional hot-air drying, it is recommended to further mill and class the thus obtained cake by any desired method.

The dry cake of the wet-milled product thus obtained is easily broken and thus fine calcium carbonate particles can be easily obtained therefrom without milling the dry cake.

The sulfonate of an alkylene oxide adduct of a monohydric alcohol to be used for producing the component (b2) is one represented by the following formula (1), for example, sodium stearyl polyethylene ether sulfonate or sodium butyl polyethylene ether polypropylene ether sulfonate:

$$RO(AO)_m SO_3 M \quad (1)$$

wherein R represents an alkyl group having 2 to 18 carbon atoms or an allyl group optionally substituted by an alkyl group having 1 to 10 carbon atoms; A represents an alkylene group having 2 to 4 carbon atoms; M represents Na, K, Li or an ammonium group; and m is a number of from 2 to 20.

The alkylsulfonate is one represented by the following formula (2), for example, sodium caprylsulfonate or sodium stearyl sulfonate:

$$R'—SO_3 M \quad (2)$$

wherein R' represents an alkyl group

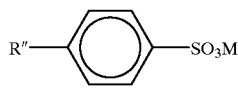

(3)

having 6 to 30 carbon atoms; and M represents Na, K, Li or an ammonium group.

The alkylbenzenesulfonate is one represented by the following formula (3), for example, sodium dodecylbenzenesulfonate or sodium caprylbenzenesulfonate:

wherein R" represents an alkyl group having 6 to 23 carbon atoms; and M represents Na, K, Li or an ammonium group.

The above-mentioned milled calcium carbonate particles treated in the aqueous medium are then dried by the above-mentioned fluid medium drying method to thereby give milled calcium carbonate particles of an average particle size of 0.3 to 2 μm which have been surface-treated with a sulfonate and contain few coarse particles.

Film support:

The film support comprises a resin composition which contains: (A) from 30 to 80% by weight of said composition, preferably from 45 to 80% by weight of said composition, of a crystalline polyolefin resin; and (B) from 70 to 20% by weight of said composition, preferably from 55 to 20% by weight of said composition, of milled calcium carbonate particles having an average particle size of from 0.3 to 2 μm, preferably from 0.5 to 1 μm, obtained by the above-mentioned wet-milling method.

When the content of the crystalline polyolefin resin (A) is less than 30% by weight of the composition or the content of the milled calcium carbonate particles exceeds 70% by weight of the composition, it is difficult to obtain a film having a uniform thickness. When the content of the crystalline polyolefin resin exceeds 80% by weight of the composition or the content of the milled calcium carbonate particles is less than 20% by weight of the composition, neither the promoted ink drying nor improved ink adhesion can be expected.

In addition to these components (A) and (B), the film support may further contain from 5 to 30% by weight of organic filler(s) having a melting temperature (for example, 210 to 300° C.) higher than that of the polyolefin resin (A) such as polyethylene terephthalate, polybutylene terephthalate, polycarbonate, nylon 6 and nylon 66; and not more than 10% by weight of pigment(s) having an average particle size of 1.5 μm or less such as titanium oxide, zinc oxide and barium sulfate. If desired, it may further contain heat stabilizers, UV absorbers, dispersants for fillers such as oleic acid, lubricants, etc.

Production of synthetic paper:

The resin film containing from 30 to 80% by weight of the crystalline polyolefin resin (A) and from 70 to 20% by weight of the milled calcium carbonate particles (B) is uniaxially or biaxially stretched at a temperature lower than the melting point of the above-mentioned component (A) (i.e., the crystalline polyolefin resin), preferably at 3 to 60° C. to thereby give a synthetic paper made of a finely porous stretched resin film which has fine cracks on the film surface and fine voids (microvoids) within the film.

This synthetic paper has a void ratio of from 10 to 50% as measured using the formula represented below, a density of from 0.65 to 1.20 g/cm$^2$, an opacity (JIS P-8138$_{-1976}$) of at least 80% and a beck smoothness (JIS P-8119$_{-1976}$) of from 50 to 2,500 sec.:

$$\text{void ratio } (\%) = \frac{\rho_0 - \rho}{\rho_0} \times 100$$

wherein $\rho_0$ represents the density of the resin film before stretching; and $\rho$ represents the density of the stretched resin film.

This synthetic paper may have a single layered structure. Alternatively, it may have a laminate film structure having the above-mentioned stretched film as the outmost layer together with other resin film(s).

Examples of the laminate film include one prepared by uniaxially stretching a polyolefin resin film, which contains from 0 to 40% by weight (preferably from 3 to 33% by weight) of a fine calcium carbonate powder, at a temperature lower than the melting point of the resin; laminating on the both faces of the thus stretched film a molten polyolefin resin film, which contains from 30 to 80% by weight of a crystalline polyolefin resin (A) and from 70 to 20% by weight of milled calcium carbonate particles; and then stretching the composite film in the direction at right angles to the above-mentioned axis, thus giving a stretched film having a number of fine voids (microvoids). From this film, a synthetic paper having a laminate structure with a biaxially oriented core layer can be obtained.

The synthetic paper has a thickness of from 30 to 300 μm, preferably from 60 to 200 μm. It is also possible to obtain one having a thickness of 1 mm by adhering these synthetic papers to each other with the use of an adhesive.

The stretching ratio preferably ranges from 4 to 10 both in the length and width. The stretching temperature is from 140 to 162° C. in the case of a polypropylene homopolymer (melting point: 164 to 167° C.), or from 110 to 130° C. in the case of high-density polyethylene (melting point: 121 to 134° C.).

The synthetic paper of the present invention is useful as offset printing paper, gravure printing paper, water color inkjet recording paper and hot-melt inkjet recording paper.

Evaluation of inkjet recording paper:

When suitability as an inkjet recording paper is measured by the contact angle of water to the recording paper, the synthetic paper of the present invention cannot be clearly distinguished from the conventional inkjet recording papers, which makes the appropriate evaluation impossible. Thus, a water color ink of the following composition (JP-B-7-2428) is dropped onto the surface of the inkjet recording paper made of the synthetic paper of the present invention and the contact angle of ink drop to the recording paper is evaluated:

| | |
|---|---|
| C.I. Food Black 2 | 2% by weight, |
| N-methyl-2-pyrrolidone | 10% by weight, |
| diethylene glycol | 20% by weight, |
| polyethylene glycol (m.w.: 200) | 15% by weight, and |
| water | 53% by weight. |

To use the synthetic paper of the present invention as an inkjet recording paper, the contact angle of the ink drop to the recording paper preferably ranges from 20 to 42°. When the contact angle of the ink drop exceeds 42°, the water color ink scarcely penetrates into the recording paper and can be dried only slowly. When the contact angle is less than 20°, the ink penetrates well and shows good drying properties. In this case, however, the fixing properties of the dye in the ink are worsened and it undergoes loss of gloss and running, thus giving poor image qualities.

To further illustrate the present invention in greater detail, the following Examples will be given.

Production of water-soluble cationic copolymer (dispersant)

REFERENTIAL EXAMPLE 1

Into a reactor provided with a reflux condenser, a thermometer, a dropping funnel, a stirrer and a gas inlet tube were fed 500 parts of diallylamine hydrochloride (60% by mol) and 200 parts of acrylamide (40% by mol). Then the temperature in the system was elevated to 50° C. while introducing nitrogen gas thereinto. Under stirring, 40 parts of 2,2-azobis(2-amidinopropane) dihydrochloride (10% by mol) employed as a polymerization initiator was added thereto 4 times at intervals of 2 hours. After reacting for 10 hours, a viscous, pale yellow liquid was obtained. 50 g of this product was weighed and poured into 500 ml of acetone. The white precipitate thus formed was collected by filtration, well washed twice with 100 ml portions of acetone and then dried under reduced pressure to thereby give a water-soluble cationic copolymer dispersant as a white solid. When measured by GPC, this copolymer had a weight-average molecular weight of 650,000.

REFERENTIAL EXAMPLE 2

Into a reactor provided with a reflux condenser, a thermometer, a dropping funnel, a stirrer and a gas inlet tube were fed 200 parts of diallylamine hydrochloride (60% by mol), 40 parts of acrylamide (40% by mol) and 220 parts of water. Then the temperature in the system was elevated to 60° C. while introducing nitrogen gas thereinto. Under stirring, 40 parts of 2,2-azobis(2-amidinopropane) dihydrochloride (10% by mol) employed as a polymerization initiator was added thereto 4 times at intervals of 2 hours. 1.5 hours after the first addition of the initiator, 280 parts of acrylamide (18% by mol) was dropped thereinto from the dropping funnel over 4 hours. The reaction was continued for 2 hours after the completion of the final addition of the initiator and thus a viscous, pale yellow liquid was obtained. 50 g of this product was weighed and poured into 500 ml of acetone. The white precipitate thus formed was collected by filtration, well washed twice with 100 ml portions of acetone and then dried under reduced pressure to thereby give a water-soluble cationic copolymer dispersant as a white solid. When measured by GPC, this copolymer had a weight-average molecular weight of 260,000.

Production of wet-milled calcium carbonate

PRODUCTION EXAMPLE 1

Coarse granular heavy calcium carbonate having an average particle size of 30 $\mu$m (dry-milled product manufactured by Nihon Cement Co., Ltd.) was mixed with water so as to give a weight ratio of 40/60. Then 0.06 parts by weight, per 100 parts by weight of the heavy calcium carbonate, of the water-soluble cationic copolymer dispersant obtained in the above Referential Example 1 was added thereto and the resulting mixture was wet-milled by using a medium stirring mill of the table attritor type with the use of glass beads (diameter: 2.0 mm) at a filling rate of 170% at a peripheral speed of 10 m/sec. Next, the milled product was classed by passing through a 350-mesh screen and the particles passing through the 350-mesh screen were dried with a fluid medium dryer MDS-200 (manufactured by Nara Kikai Seisakusho K.K.). When measured with a Microtrack (manufactured by Nikkiso K.K.), the milled calcium carbonate thus obtained had an average particle size of 1.5 $\mu$m.

PRODUCTION EXAMPLE 2

Wet-milled heavy calcium carbonate was obtained by using the same composition and the same procedure as those described in the above Production Example 1 but prolonging the stirring time with the stirring mill of the attritor type and using glass beads of 1.5 mm in diameter.

When measured with a Microtrack, the milled calcium carbonate thus obtained had an average particle size of 1.0 $\mu$m.

PRODUCTION EXAMPLE 3

Wet-milled heavy calcium carbonate was obtained by using the same composition and the same procedure as those described in the above Production Example 1 but further prolonging, compared with Production Example 2, the stirring time with the stirring mill of the attritor type and using glass beads of 1.0 mm in diameter. When measured with a Microtrack, the milled calcium carbonate thus obtained had an average particle size of 0.4 $\mu$m.

PRODUCTION EXAMPLE 4

Coarse granular heavy calcium carbonate having an average particle size of 30 $\mu$m (dry-milled product manufactured by Nihon Cement Co., Ltd.) was mixed with water so as to give a weight ratio of 40/60. Then 0.06 parts by weight, per 100 parts by weight of the heavy calcium carbonate, of the water-soluble cationic copolymer dispersant obtained in the above Referential Example 2 was added thereto and the resulting mixture was wet-milled by using a medium stirring mill of the table attritor type with the use of glass beads (diameter: 1.5 mm) at a filling rate of 170% at a peripheral speed of 10 m/sec. Next, the milled product was classed by passing through a 350-mesh screen and the particles passing through the 350-mesh screen were dried with a fluid medium dryer MDS-200 (manufactured by Nara Kikai Seisakusho K.K.). When measured with a Microtrack (manufactured by Nikkiso K.K.), the milled calcium carbonate thus obtained had an average particle size of 1.0 $\mu$m.

Production of surface-treated calcium carbonate

PRODUCTION EXAMPLE 5

Coarse granular heavy calcium carbonate having an average particle size of 30 $\mu$m (dry-milled product manufactured by Nihon Cement Co., Ltd.) was mixed with water so as to give a weight ratio of 40/60. Then 0.06 parts by weight, per 100 parts by weight of the heavy calcium carbonate, of the water-soluble cationic copolymer dispersant obtained in the above Referential Example 1 was added thereto and the resulting mixture was wet-milled by using a medium stirring mill of the table attritor type with the use of glass beads (diameter: 1.5 mm) at a filling rate of 170% at a peripheral speed of 10 m/sec.

Next, 40 parts of a 1% by weight aqueous solution of sodium stearyl polyethylene ether sulfonate was added thereto and stirred. Then the resulting mixture was classed by passing through a 350-mesh screen and the particles passing through the 350-mesh screen were dried with a fluid medium dryer MDS-200 (manufactured by Nara Kikai Seisakusho K.K.). When measured with a Microtrack (manufactured by Nikkiso K.K.), the milled calcium carbonate thus obtained had an average particle size of 1.5 μm.

A 10% by weight dispersion of this powder in pure water showed an electrical conductivity at 25° C. of 300 μS/cm, when measured with an electrical conductivity meter MODEL SC82™ manufactured by YOKOGAWA.

PRODUCTION EXAMPLE 6

A milled calcium carbonate powder of an average particle size of 1.5 μm was obtained by the same procedure as the one of Production Example 5 but substituting the sodium stearyl polyethylene ether sulfonate by a 1% by weight solution of sodium dodecylbenzenesulfonate. This product showed an electrical conductivity at 25° C. of 250 μS/cm.

PRODUCTION EXAMPLE 7

A milled calcium carbonate powder of an average particle size of 1.5 μm was obtained by the same procedure as the one of Production Example 5 but substituting the sodium stearyl polyethylene ether sulfonate by a 1% by weight solution of sodium alkylsulfonate ANTEX SAS™ (manufactured by Toho Chemical Industry Co., Ltd.). This product showed an electrical conductivity at 25° C. of 380 μS/cm.

PRODUCTION EXAMPLE 8

Sulfonate-treated heavy calcium carbonate was obtained by using the same composition and the same procedure as those of Production Example 5 but prolonging the stirring time with the stirring mill of the attritor type and using glass beads of 1.5 mm in diameter.

When measured with a Microtrack, the milled calcium carbonate thus obtained had an average particle size of 1.0 μm. It showed an electrical conductivity at 25° C. of 340 μS/cm.

PRODUCTION EXAMPLE 9

Sulfonate-treated heavy calcium carbonate was obtained by using the same composition and the same procedure as those of Production Example 5 but further prolonging, compared with Production Example 8, the stirring time with the stirring mill of the attritor type and using glass beads of 1.0 mm in diameter. When measured with a Microtrack, the milled calcium carbonate thus obtained had an average particle size of 0.4 μm. It showed an electrical conductivity at 25° C. of 420 μS/cm.

PRODUCTION EXAMPLE 10

Coarse granular heavy calcium carbonate having an average particle size of 30 μm (dry-milled product manufactured by Nihon Cement Co., Ltd.) was mixed with water so as to give a weight ratio of 40/60. Then 0.06 parts by weight, per 100 parts by weight of the heavy calcium carbonate, of the water-soluble cationic copolymer dispersant obtained in the above Referential Example 2 was added thereto and the resulting mixture was wet-milled by using a medium stirring mill of the table attritor type with the use of glass beads (diameter: 1.5 mm) at a filling rate of 170% at a peripheral speed of 10 m/sec. By using sodium stearyl polyethylene ether sulfonate employed in Production Example 5, milled calcium carbonate particles of 1.0 μm in average particle size were obtained. This product showed an electrical conductivity at 25° C. of 320 μS/cm.

EXAMPLE 1

(1) To a mixture of 70% by weight of a propylene homopolymer (manufactured by Mitsubishi Chemical), which had an MFR of 0.8 g/10 min, a melting point of 164° C. (DSC peak temperature) and a crystallinity of 67%, with 5% by weight of high-density polyethylene was added 22% by weight of the milled calcium carbonate obtained in the above Production Example 1 and having an average particle size of 1.5 μm. The thus obtained blend [i] was melt-kneaded in an extruder adjusted to 270° C. and extruded in the form of a sheet. After cooling to 50° C., an unstretched sheet was obtained. Next, this sheet was heated to 135° C. and stretched 5-fold lengthwise.

(2) 40% by weight of a propylene homopolymer (manufactured by Mitsubishi Chemical), which had an MFR of 2 g/10 min, a melting point of 164° C. (DSC peak temperature) and a crystallinity of 65%, was mixed with 60% by weight of the milled calcium carbonate obtained in the above Production Example 1 and having an average particle size of 0.7 μm. The thus obtained blend [ii] was melt-kneaded in an extruder adjusted to 270° C. Next, it was laminated onto the both faces of the 5-fold stretched sheet produced in the above (1) by using two extruders.

The laminate sheet composed of these three layers was heated to 155° C. and stretched 8-fold in the cross direction by using a tenter stretcher. Subsequently, the obtained stretched film was subjected to corona discharge at 50 W/m²·min by using a corona discharge treatment machine (manufactured by Kasuga Denki K.Ki.) to thereby give a three-layered stretched film. The layers ([ii]/[i]/[ii]) of this stretched film had thicknesses of 20 μm/60 μm/20 μm/respectively, while the film had a beck smoothness of 800 sec, a density of 0.78 g/cm³ and a void ratio of 35%.

COMPARATIVE EXAMPLE 1

(1) To a mixture of 70% by weight of a propylene homopolymer (manufactured by Mitsubishi Chemical), which had an MFR of 0.8 g/10 min, a melting point of 164° C. (DSC peak temperature) and a crystallinity of 67%, with 8% by weight of high-density polyethylene was added 22% by weight of dry-milled calcium carbonate having an average particle size of 1.5 μm (SOFTON 1800™ manufactured by Shiraishi Calcium K.K.). The thus obtained blend [i] was melt-kneaded in an extruder adjusted to 270° C. and extruded in the form of a sheet. After cooling to 50° C., an unstretched sheet was obtained. Next, this sheet was heated to 135° C. and stretched 5-fold lengthwise.

(2) 40% by weight of a propylene homopolymer (manufactured by Mitsubishi Chemical), which had an MFR of 2 g/10 min, a melting point of 164° C. (DSC peak temperature) and a crystallinity of 65%, was mixed with 60% by weight of dry-milled calcium carbonate having an average particle size of 1.5 μm (SOFTON 1800™ manufactured by Shiraishi Calcium K.K.). The thus obtained blend [ii] was melt-kneaded in an extruder adjusted to 270° C. Next, it was laminated onto the both faces of the 5-fold stretched sheet produced in the above (1) by using two extruders. The laminate sheet composed of these three layers was heated to 155° C. and stretched 8-fold in the cross direction by using a tenter stretcher. Subsequently, the obtained stretched film was subjected to corona discharge at 50 W/m²·min by using a corona discharge treatment machine (manufactured by Kasuga Denki K.Ki.) to thereby give a three-layered stretched film.

The layers ([ii]/[i]/[ii]) of this stretched film had thicknesses of 20 μm/60 μm/20 μm/respectively, while the film had a beck smoothness of 450 sec, a density of 0.70 g/cm³ and a void ratio of 41%.

COMPARATIVE EXAMPLE 2

(1) To a mixture of 70% by weight of a propylene homopolymer (manufactured by Mitsubishi Chemical), which had an MFR of 0.8 g/10 min, a melting point of 164° C. (DSC peak temperature) and a crystallinity of 67%, with 8% by weight of high-density polyethylene was added 22% by weight of synthetic light calcium carbonate having an average particle size of 0.15 μm (BRILLIANT 15™ manufactured by Shiraishi Kogyo K.K.). The thus obtained blend [i] was melt-kneaded in an extruder adjusted to 270° C. and extruded in the form of a sheet. After cooling to 50° C., an unstretched sheet was obtained. Next, this sheet was heated to 135° C. and stretched 5-fold lengthwise.

(2) 40% by weight of a propylene homopolymer (manufactured by Mitsubishi Chemical), which had an MFR of 2 g/10 min, a melting point of 164° C. (DSC peak temperature) and a crystallinity of 65%, was mixed with 60% by weight of synthetic light calcium carbonate having an average particle size of 0.15 μm (BRILLIANT 15™ manufactured by Shiraishi Kogyo K.K.). The thus obtained blend [ii] was melt-kneaded in an extruder adjusted to 270° C. Next, it was laminated onto the both faces of the 5-fold stretched sheet produced in the above (1) by using two extruders. The laminate sheet composed of these three layers was heated to 155° C. and stretched 8-fold in the cross direction by using a tenter stretcher. Subsequently, the obtained stretched film was subjected to corona discharge at 50 W/m²min by using a corona discharge treatment machine (manufactured by Kasuga Denki K.K.) to thereby give a three-layered stretched film.

The layers ([ii]/[i]/[ii]) of this stretched film had thicknesses of 20 μm/60 μm/20 μm/respectively.

EXAMPLES 2 TO 6

Stretched laminate films were obtained by the same procedure as the one described in Example 1 but using the blends [i] and [ii] as specified in Table 1.

EXAMPLE 7

To a mixture of 70% by weight of a propylene homopolymer (manufactured by Mitsubishi Chemical), which had an MFR of 2 g/10 min, a melting point of 164° C. (DSC peak temperature) and a crystallinity of 67%, with 8% by weight of high-density polyethylene was added 22% by weight of the milled calcium carbonate obtained in the above Production Example 2 and having an average particle size of 1.0 μm to thereby give the blend [i]. Separately, 40% by weight of a propylene homopolymer (manufactured by Mitsubishi Chemical), which had an MFR of 20 g/10 min, a melting point of 164° C. (DSC peak temperature) and a crystallinity of 65%, was mixed with 60% by weight of the milled calcium carbonate obtained in the above Production Example 2 and having an average particle size of 1.0 μm to thereby give the blend [ii]. These blends [i] and [ii] were separately melt-kneaded in two extruders each adjusted to 270° C. and then co-extruded in a laminated state so that the blend [i] was sandwiched between the blends [ii]. After cooling, a three-layered unstretched film was obtained.

Then this sheet was heated to 135° C. and uniaxially stretched 5-fold lengthwise.

Further, the obtained stretched film was subjected to corona discharge at 50 W/m² min by using a corona discharge treatment machine (manufactured by Kasuga Denki K.K.) to thereby give a three-layered stretched film. The layers ([ii]/[i]/[ii]) of this stretched film had thicknesses of 20 μm/60 μm/20 μm/respectively, while the film had a beck smoothness of 950 sec, a density of 0.85 g/cm³ and a void ratio of 29%.

EXAMPLE 8

A three-layered, uniaxially stretched sheet was obtained by the same composition, the same layer constitution (i.e., [ii]/[i]/[ii]) and the same procedure as those described in the above Example 7 but varying the thickness of each layer.

Next, this film was stretched 8-fold in the cross direction by using a tenter stretcher heated to 155° C. to thereby give a three-layered, biaxially stretched film.

Subsequently, the obtained stretched film was subjected to corona discharge at 50 W/m² min by using a corona discharge treatment machine (manufactured by Kasuga Denki K.K.) to thereby give a three-layered stretched film. The layers ([ii]/[i]/[ii]) of this stretched film had thicknesses of 15 μm/50 μm/15 μm/respectively, while the film had a beck smoothness of 2,000 sec, a density of 0.70 g/cm³ and a void ratio of 42%.

COMPARATIVE EXAMPLES 3 AND 4

Stretched laminate films were obtained by the same procedure as the one described in Example 7 but using the blends [i] and [ii] as specified in Table 2.

COMPARATIVE EXAMPLES 5 AND 6

Stretched laminate films were obtained by the same procedure as the one described in Example 8 but using the blends [i] and [ii] as specified in Table 2.
[Evaluation method]

Synthetic papers were evaluated in the following manner:
[Gloss]

Determined in accordance with JIS P-8142$_{-1965}$ (75°).
[Cut in surface layer]

None: No cut was observed in surface layer with the naked eye or under a magnifier.

Slight: No cut was observed with the naked eye but some were observed under a magnifier. Causing no problem in practice.

Yes: Cuts were slightly observed with the naked eye and confirmed under a magnifier. Causing some problems in practice.

Serious: Cuts were obviously confirmed with the naked eye. Unusable in practice.
(Offset printability)

Synthetic paper was cut into a size (length: 636 mm, width: 469 mm) and 500 copies were continuously printed by using an offset printing machine DIA Model 2 (manufactured by Mitsubishi Heavy Industries, Ltd.) at 20° C. under relative humidity of 50%.

<Ink adhesion>

An adhesive tape "Cellotape™" (manufactured by Nichiban Co., Ltd.) was adhered strongly onto the ink surface of an offset printed sample and then peeled off at a constant speed and a constant angle. The degree of the ink separated from the sample was evaluated in accordance with the following criteria.

⊚: The film per se was broken.

○: The ink was slightly separated, causing no problem in practice.

Δ: The ink was almost separated off while showing peeling-resistance. Some problem in practice.

X: The ink was completely separated off without showing any peeling-resistance. Unusable in practice.

<Ink transfer density>

The density of a solid-printed part (net density: 100%) was measured with a printing densitometer Macbeth 900 manufactured by Sakata Inx Corporation) and evaluated in accordance with the following criteria.

⊚: $1.5 \leq$ measured density.

○: $1.2 \leq$ measured density<1.5. No problem in practice.

Δ: $0.9 \leq$ measured density<1.2. Some problem in practice.

X: 0.9>measured density. Unusable in practice.

<Paper dust>

After printing 500 copies, extent of the paper dust adhesion onto the blanket was evaluated with the naked eye in accordance with the following criteria.

⊚: Scarcely any adhesion.

○: Slight adhesion, not affecting the printed matters.

Δ: Adhesion, slightly affecting the printed matters.

X: Serious adhesion, largely affecting the printed matters.

(Gravure printability)

Synthetic paper was cut into the A4 size and printed with the use of a rod bar (#8) and a gravure ink (CCST-16 scarlet, manufactured by Toyo Ink Mfg. Co., Ltd.). After the completion of the printing, the synthetic paper was allowed to stand in room for 1 day and then subjected to the following evaluations.

<Ink adhesion>

An adhesive tape "Cellotape™" (manufactured by Nichiban Co., Ltd.) was adhered strongly onto the ink surface of a printed sample and then peeled off at a constant speed and a constant angle. The degree of the ink separated from the sample was evaluated in accordance with the following criteria.

⊚: The film per se was broken.

○: The ink was slightly separated, causing no problem in practice.

Δ: The ink was almost separated off while showing peeling-resistance. Some problem in practice.

X: The ink was completely separated off without showing any peeling-resistance. Unusable in practice.

<White spots>

White parts noticeable with the naked eye caused by the separation of ink were counted on 2 printed samples.

EXAMPLES 9 AND 10 AND COMPARATIVE EXAMPLE 7

The synthetic papers obtained in Examples 1 and 7 and Comparative Example 1 were color printed (yellow, magenta, cyan, black) with a water color ink jet printer (manufactured by Canon Inc.) and the time required for drying the inks was measured. As a result, it took 20, 30 and 70 seconds for drying the inks on the synthetic papers of Examples 1 and 7 and Comparative Example 1 respectively.

After confirming that each color had been developed well, an adhesive tape "Cellotape™" (manufactured by Nichiban Co., Ltd.) was adhered strongly onto a part of each printed paper and then quickly peeled off along the adhesion face. Then the ink remaining on the synthetic paper was evaluated with the naked eye. As a result, each synthetic paper showed a high ink remaining ratio (95 to 100%).

On the other hand, the printed synthetic paper was immersed in running water for 5 minutes and dried. Then the extent of the image remaining thereon and wrinkling were examined. As a result, each of the samples showed an excellent image remaining thereon and no wrinkling.

EXAMPLE 11

(1) To a mixture of 70% by weight of polypropylene (manufactured by Mitsubishi Chemical), which had an MFR of 0.8 g/10 min, a melting point of 164° C. (DSC peak temperature) and a crystallinity of 67%, with 8% by weight of high-density polyethylene was added 22% by weight of the milled calcium carbonate obtained in the above Production Example 5 and having an average particle size of 1.5 μm. The thus obtained blend [i] was melt-kneaded in an extruder adjusted to 270° C. and extruded in the form of a sheet. After cooling to 50° C., an unstretched sheet was obtained. Next, this sheet was heated to 150° C. and stretched 5-fold lengthwise.

(2) 40% by weight of a propylene homopolymer (manufactured by Mitsubishi Chemical), which had an MFR of 2 g/10 min, a melting point of 164° C. (DSC peak temperature) and a crystallinity of 65%, was mixed with 60% by weight of the milled calcium carbonate obtained in the above Production Example 5 and having an average particle size of 1.5 μm. The thus obtained blend [ii] was melt-kneaded in an extruder adjusted to 270° C. Next, it was laminated onto the both faces of the 5-fold stretched sheet produced in the above (1) by using two extruders.

The laminate sheet composed of these three layers was heated to 155° C. and stretched 8-fold in the cross direction by using a tenter stretcher. Subsequently, the obtained stretched film was subjected to corona discharge at 50 W/m²·min by using a corona discharge treatment machine (manufactured by Kasuga Denki K.K.) to thereby give a three-layered stretched film. The layers ([ii]/[i]/[ii]) of this stretched film had thicknesses of 20 μm/60 μm/20 μm/respectively, while the film had a beck smoothness of 1,000 sec, a density of 0.78 g/cm³, a void ratio of 35% and an opacity of 93%.

It showed a contact angle of 25° to the water color inkjet ink with the above-mentioned composition.

COMPARATIVE EXAMPLE 8

(1) To a mixture of 70% by weight of a propylene homopolymer (manufactured by Mitsubishi Chemical), which had an MFR of 0.8 g/10 min, a melting point of 164° C. (DSC peak temperature) and a crystallinity of 67%, with 8% by weight of high-density polyethylene was added 22% by weight of the dry-milled calcium carbonate having an average particle size of 1.5 μm and showing an electrical conductivity at 25° C. of 63 μS/cm (SOFTON 1800™ manufactured by Shiraishi Calcium K.K.). The thus obtained blend [i] was melt-kneaded in an extruder adjusted to 270° C. and extruded in the form of a sheet. After cooling to 50° C., an unstretched sheet was obtained. Next, this sheet was heated to 135° C. and stretched 5-fold lengthwise.

(2) 40% by weight of a propylene homopolymer (manufactured by Mitsubishi Chemical), which had an MFR of 2 g/10 min, a melting point of 164° C. (DSC peak temperature) and a crystallinity of 65%, was mixed with 60% by weight of dry-milled calcium carbonate having an average particle size of 1.5 µm and showing an electrical conductivity at 25° C. of 63 µS/cm (SOFTON 1800™ manufactured by Shiraishi Calcium K.K.). The thus obtained blend [ii] was melt-kneaded in an extruder adjusted to 270° C. Next, it was laminated onto the both faces of the 5-fold stretched sheet produced in the above (1) by using two extruders. The laminate sheet composed of these three layers was heated to 155° C. and stretched 8-fold in the cross direction by using a tenter stretcher. Subsequently, the obtained stretched film was subjected to corona discharge at 50 W/m$^2$·min by using a corona discharge treatment machine (manufactured by Kasuga Denki K.K.) to thereby give a three-layered stretched film.

The layers ([ii]/[i]/[ii]) of this stretched film had thicknesses of 20 µm/60 µm/20 µm/respectively, while the film had a beck smoothness of 450 sec, a density of 0.70 g/cm$^3$, a void ratio of 41% and an opacity of 93%.

It showed a contact angle of 55° to the water color inkjet ink with the above-mentioned composition.

COMPARATIVE EXAMPLE 9

(1) To a mixture of 70% by weight of a propylene homopolymer (manufactured by Mitsubishi Chemical), which had an MFR of 0.8 g/10 min, a melting point of 164° C. (DSC peak temperature) and a crystallinity of 67%, with 8% by weight of high-density polyethylene was added 22% by weight of synthetic light calcium carbonate having an average particle size of 0.15 µm and showing an electrical conductivity at 25° C. of 89 µS/cm (BRILLIANT 15™ manufactured by Shiraishi Kogyo K.K.). The thus obtained blend [i] was melt-kneaded in an extruder adjusted to 270° C. and extruded in the form of a sheet. After cooling to 50° C., an unstretched sheet was obtained. Next, this sheet was heated to 135° C. and stretched 5-fold lengthwise.

(2) 40% by weight of a propylene homopolymer (manufactured by Mitsubishi Chemical), which had an MFR of 2 g/10 min, a melting point of 164° C. (DSC peak temperature) and a crystallinity of 65%, was mixed with 60% by weight of synthetic light calcium carbonate having an average particle size of 0.15 µm and showing an electrical conductivity at 25° C. of 89 µS/cm (BRILLIANT 15™ manufactured by Shiraishi Kogyo K.K.). The thus obtained blend [ii] was melt-kneaded in an extruder adjusted to 270° C. Next, it was laminated onto the both faces of the 5-fold stretched sheet produced in the above (1) by using two extruders. The laminate sheet composed of these three layers was heated to 155° C. and stretched 8-fold in the cross direction by using a tenter stretcher. Subsequently, the obtained stretched film was subjected to corona discharge at 50 W/m$^2$·min by using a corona discharge treatment machine (manufactured by Kasuga Denki K.K.) to thereby give a three-layered stretched film.

The layers ([ii]/[i]/[ii]) of this stretched film had thicknesses of 20 µm/60 µm/20 µm/respectively, while the film had a beck smoothness of 2,000 sec, a void ratio of 25% and an opacity of 85%.

It showed a contact angle of 53° to the water color inkjet ink with the above-mentioned composition.

EXAMPLES 12 TO 18

Stretched laminate films were obtained by the same procedure as the one described in Example 11 but using the blends [i] and [ii] as specified in Table 3.

EXAMPLE 19

To a mixture of 70% by weight of a propylene homopolymer (manufactured by Mitsubishi Chemical), which had an MFR of 2 g/10 min, a melting point of 164° C. (DSC peak temperature) and a crystallinity of 65%, with 8% by weight of high-density polyethylene was added 22% by weight of the milled calcium carbonate obtained in the above Production Example 8 and having an average particle size of 1.0 µm to thereby give the blend [i]. Separately, 40% by weight of a propylene homopolymer (manufactured by Mitsubishi Chemical), which had an MFR of 20 g/10 min, a melting point of 164° C. (DSC peak temperature) and a crystallinity of 64%, was mixed with 60% by weight of the milled calcium carbonate obtained in the above Production Example 8 and having an average particle size of 1.0 µm to thereby give the blend [ii]. These blends [i] and [ii] were separately melt-kneaded in two extruders each adjusted to 270° C. and then co-extruded in a laminated state so that the blend [i] was sandwiched between the blends [ii]. After cooling, a three-layered unstretched film was obtained.

Then this sheet was heated to 135° C. and uniaxially stretched 5-fold lengthwise.

Further, the obtained stretched film was subjected to corona discharge at 50 W/m$^2$min by using a corona discharge treatment machine (manufactured by Kasuga Denki K.K.) to thereby give a three-layered stretched film. The layers ([ii]/[i]/[ii]) of this stretched film had thicknesses of 20 µm/60 µm/20 µm/respectively, while the film had a beck smoothness of 950 sec, a density of 0.85 g/cm$^3$, a void ratio of 29% and an opacity of 93%.

EXAMPLE 20

A three-layered, uniaxially stretched sheet was obtained by the same composition, the same layer constitution (i.e., [ii]/[i]/[ii]) and the same procedure as those described in the above Example 19 but varying the thickness of each layer.

Next, this film was stretched 8-fold in the cross direction by using a tenter stretcher heated to 155° C. to thereby give a three-layered, biaxially stretched film.

Subsequently, the obtained stretched film was subjected to corona discharge at 50 W/m$^2$ min by using a corona discharge treatment machine (manufactured by Kasuga Denki K.K.) to thereby give a three-layered stretched film. The layers ([ii]/[i]/[ii]) of this stretched film had thicknesses of 15 µm/50 µm/15 µm/respectively, while the film had a beck smoothness of 2,000 sec, a density of 0.70 g/cm$^3$, a void ratio of 42% and an opacity of 90%.

COMPARATIVE EXAMPLES 11 AND 12

Stretched laminate films were obtained by the same procedure as the one described in Example 19 but using the blends [i] and [ii] as specified in Table 4.

COMPARATIVE EXAMPLES 13 AND 14

Stretched laminate films were obtained by the same procedure as the one described in Example 20 but using the blends [i] and [ii] as specified in Table 4.

[Evaluation method]

<Contact angle to water color inkjet printing ink>

(1) To 53% by weight of water were added 2% by weight of C.I. Food Black 2 (manufactured by Mitsubishi Chemicals), 10% by weight of N-methyl-2-pyrrolidone, 20% by weight of diethylene glycol and 15% by weight of polyethylene glycol (molecular weight: 200) and thoroughly stirred with a stirrer to thereby give a black recording liquor (ink) for water color inkjet printing.

(2) In a thermostat room (23° C., RH 50%), the above-mentioned ink was collected with a syringe and dropped in an appropriate amount onto the surface of the synthetic papers obtained in Examples 11 to 20 and Comparative Examples 7 to 13 to give a drop area of 2 mm in diameter. Immediately after dropping, the contact angle was measured with a CONTACT-ANGLE METER™ (manufactured by Kyowa Kaimenkagaku K.K.). Tables 3 and 4 show the data thus obtained.

<Inkjet ink printability>

(1) Drying time (sec)

By using an inkjet printer BJC-410J (manufactured by Canon Inc.), the synthetic papers obtained in Examples 11 to 20 and Comparative Examples 7 to 13 were color-printed with the use of water color inkjet recording liquors BCI-21 (yellow, magenta, cyan, black). Then the part printed in each color was finger-rubbed and the time required for giving no mark was referred to as the drying time.

(2) Running

The running of each color ink printed under the above-mentioned conditions was evaluated with the naked eye according to the following criteria.

◎: Running was observed in no color.

○: Slight running was observed in a particular color, causing no problem in practice.

Δ: Running was observed in each color, being unusable in practice.

X: Serious running was observed in each color.

(3) Image quality

A portrait was printed by using the same printer and recording liquors and the qualities of the image were evaluated with the naked eye according to the following criteria.

◎: Good.

○: Ink density was somewhat low, causing no problem in practice.

Δ: Unusable in practice due to low ink density and ink running.

X: Poor.

<Ink remaining property in inkjet printing>

Next, an adhesive tape "Cellotape™" (manufactured by Nichiban Co., Ltd.) was adhered strongly onto a part of each printed paper and then quickly peeled off along the adhesion face. Tables 3 and 4 show the ink remaining on the synthetic papers.

<Drying property of aqueous adhesive>

The synthetic papers obtained in Examples 11 to 20 and Comparative Examples 8 to 14 were cut into pieces (8×8 cm). Then a starch adhesive TOKIWANOL 600™ (solid content: 33%, manufactured by Tokiwa Kagaku K.K.) was uniformly applied on the surface thereof with an applicator to give a thickness of 10 μm. The time required until the gloss of the adhesive disappeared due to the penetration of the moisture thereof into the paper was referred to as the drying time.

The present invention makes it possible to provide a synthetic paper having projections of finely milled calcium carbonate particles with hydrophilic surface around which a number of fine cracks are formed and showing improved moisture absorptivity for water color inks and aqueous adhesives, quick drying properties and excellent printability. Japanese Patent Application Nos. 9-10484 and 9-27336 are incorporated by reference herein.

TABLE 1

| | Blend [i] | | | Blend [ii] Blending amount (wt. %) | | | Surface Properties | | Printability | | | | | Stretched layer constitution |
|---|---|---|---|---|---|---|---|---|---|---|---|---|---|---|
| | Blending amount (wt. %) | | | | | Particle | | Cut in | Offset printing | | | Gravure printing | | |
| | PP | PE | Calcium carbonate | Particle size (μm) | PP | Calcium carbonate | size (μm) | Gloss (%) | surface layer | Adhesion | Density | Paper dust | Adhesion | White spots | |
| Example 1 | 70 | 8 | 22 Production example 1 | 1.5 | 40 | 60 Production example 1 | 1.5 | 20 | None | ◎ | ○ | ○ | ◎ | 2 | uniaxial |
| Example 2 | 70 | 8 | 22 Production example 2 | 1.0 | 40 | 60 Production example 2 | 1.0 | 25 | None | ◎ | ◎ | ◎ | ◎ | 3 | biaxial |
| Example 3 | 70 | 8 | 22 Production example 3 | 0.4 | 40 | 60 Production example 3 | 0.4 | 33 | Slight | ◎ | ◎ | ◎ | ◎ | 5 | uniaxial |
| Example 4 | 65 | 8 | 27 Production example 1 | 1.5 | 60 | 40 Production example 3 | 0.4 | 50 | None | ○ | ◎ | ◎ | ○ | 1 | |
| Example 5 | 60 | 8 | 32 Production example 1 | 1.5 | 80 | 70 Production example 1 | 1.5 | 15 | Slight | ◎ | ○ | ○ | ◎ | 5 | |
| Example 6 | 70 | 8 | 22 Production example 1 | 1.5 | 50 | 50 Production example 4 | 1.0 | 25 | None | ○ | ◎ | ○ | ○ | 1 | |
| Comp. Example 1 | 70 | 8 | 22 Dry-milled calcium carbonate | 1.5 | 40 | 60 Dry-milled calcium carbonate | 1.0 | 20 | None | Δ | ○ | Δ | ○ | 3 | |
| Comp. Example 2 | 70 | 8 | 22 Light calcium carbonate | 0.15 | 40 | 60 Production example 1 | 0.15 | 5 | Serious | Δ | ◎ | Δ | Δ | 20 | |

PP: propylene
PB: high density polyethylene

TABLE 2

| | Blend [i] Blending amount (wt. %) | | | | Blend [ii] Blending amount (wt. %) | | | Surface Properties | | Printability | | | | | Stretched layer constitution |
|---|---|---|---|---|---|---|---|---|---|---|---|---|---|---|---|
| | | | | | | | | | | Offset printing | | | Gravure printing | | |
| | PP | PE | Calcium carbonate | Particle size (μm) | PP | Calcium carbonate | Particle size (μm) | Gloss (%) | Cut in surface layer | Adhesion | Density | Paper dust | Adhesion | White spots | |
| Example 7 | 70 | 8 | 22 Production example 1 | 1.0 | 40 | 60 Production example 1 | 1.0 | 25 | None | ◎ | ◎ | ◎ | ◎ | 1 | 3-layer uniaxial |
| Example 8 | 70 | 8 | 22 Production example 2 | 1.0 | 40 | 60 Production example 1 | 1.0 | 35 | None | ◎ | ◎ | ○ | ◎ | 2 | 3-layer biaxial |
| Comp. Example 3 | 70 | 8 | 22 Dry-milled calcium carbonate | 1.5 | 40 | 60 Dry-milled calcium carbonate | 1.5 | 25 | Slight | Δ | ○ | ○ | ○ | 2 | 3-layer uniaxial |
| Comp. Example 4 | 70 | 8 | 22 Light calcium carbonate | 0.15 | 40 | 60 Light calcium carbonate | 0.15 | 6 | Slight | ○ | Δ | ○ | Δ | 16 | |
| Comp. Example 5 | 70 | 8 | 22 Dry-milled calcium carbonate | 1.5 | 40 | 60 Dry-milled calcium carbonate | 1.5 | 30 | None | Δ | ○ | Δ | ○ | 5 | 3-layer biaxial |
| Comp. Example 5 | 70 | 8 | 22 Light calcium carbonate | 0.15 | 40 | 50 Light calcium carbonate | 0.15 | 15 | Serious | Δ | Δ | Δ | Δ | 20< | |

TABLE 3

| | Blend [i] Blending Amount (wt. %) | | | | Blend [ii] Blending Amount (wt. %) | | | Contact angle to water | Printability of water color inkjet ink | | | | Void ratio (%) | Remaining ink (%) | Drying time of aqueous adhesive (min.) | Stretched layer constitution |
|---|---|---|---|---|---|---|---|---|---|---|---|---|---|---|---|---|
| | | | | | | | | | | color inkjet ink | | | | | | |
| | PP | PE | Calcium Carbonate | Particle size (μm) | PP | Calcium Carbonate | Particle size (μm) | color inkjet ink | drying (sec.) | Running | Image quality | | | | | |
| Example 11 | 70 | 8 | 22 Production Example 5 | 1.5 | 40 | 60 Production Example 5 | 1.5 | 25 | 10 | ◎ | ◎ | 35 | 95 | 10 | uniaxial |
| Example 12 | 70 | 8 | 22 Production Example 6 | 1.5 | 40 | 60 Production Example 6 | 1.5 | 35 | 12 | ○ | ◎ | 32 | 95 | 5 | biaxial |
| Example 13 | 70 | 8 | 22 Production Example 7 | 1.5 | 40 | 60 Production Example 7 | 1.5 | 23 | 8 | ◎ | ◎ | 35 | 90 | 15 | uniaxial |
| Example 14 | 70 | 8 | 22 Production Example 8 | 1.0 | 40 | 60 Production Example 8 | 1.0 | 26 | 10 | ◎ | ◎ | 30 | 95 | 10 | |
| Example 15 | 70 | 8 | 22 Production Example 9 | 0.4 | 40 | 60 Production Example 9 | 0.4 | 30 | 10 | ◎ | ◎ | 25 | 90 | 20 | |
| Example 16 | 70 | 8 | 22 Production Example 10 | 1.5 | 40 | 60 Production Example 10 | 1.5 | 22 | 6 | ◎ | ◎ | 38 | 95 | 10 | |
| Example 17 | 62 | 8 | 30 Production Example 8 | 1.0 | 40 | 60 Production Example 8 | 1.0 | 40 | 18 | ○ | ○ | 40 | 90 | 25 | |
| Example 18 | 77 | 8 | 15 Production Example 8 | 1.0 | 30 | 70 Production Example 8 | 1.0 | 22 | 5 | ◎ | ◎ | 26 | 100 | 5 | |
| Comp. Example 8 | 70 | 8 | 22 Dry-milled calcium carbonate | 1.5 | 40 | 60 Dry-milled calcium carbonate | 1.5 | 55 | 100< | X | X | 39 | 20 | 60< | |
| Comp. Example 9 | 70 | 8 | 22 Light calcium carbonate | 0.15 | 40 | 60 Light calcium carbonate | 0.15 | 53 | 100< | X | X | 25 | 40 | 60< | |

PP: propylene homopolymer
PB: high density polyethylene

TABLE 4

| | Blend [i] Blending Amount (wt. %) | | | | Blend [ii] Blending Amount (wt. %) | | | Contact angle to water | Printabitity of water | | | | Drying time of aqueous | Stretched |
|---|---|---|---|---|---|---|---|---|---|---|---|---|---|---|
| | PP | PE | Calcium Carbonate | Particle size (μm) | PP | | Calcium Carbonate | Particle size (μm) | color inkjet ink | color inkjet ink drying (sec.) | Running | Image quality | Void ratio (%) | Remaining ink (%) | adhesive (min.) | layer constitution |
| Example 19 | 70 | 8 | 22 Production Example 8 | 1.0 | 40 | 60 | Production Example 8 | 1.0 | 28 | 12 | ○ | ◉ | 29 | 90 | 3 | 3-layer uniaxial |
| Example 20 | 70 | 8 | 22 Production Example 8 | 1.0 | 40 | 60 | Production Example 8 | 1.0 | 24 | 8 | ◉ | ◉ | 42 | 95 | 5 | 3-layer biaxial |
| Comp. Example 10 | 70 | 8 | 22 Dry-milled calcium carbonate | 1.5 | 40 | 60 | Dry-milled calcium carbonate | 1.5 | 60 | 100< | X | X | 34 | 30 | 60< | 3-layer uniaxial |
| Comp. Example 11 | 70 | 8 | 22 Light calcium carbonate | 0.15 | 40 | 60 | Light calcium carbonate | 0.15 | 58 | 100< | X | X | 16 | 60 | 60< | 3-layer uniaxial |
| Comp. Example 12 | 70 | 8 | 22 Dry-milled calcium carbonate | 1.5 | 40 | 60 | Dry-milled calcium carbonate | 1.5 | 53 | 100< | X | X | 48 | 40 | 60< | 3-layer biaxial |
| Comp. Example 13 | 70 | 8 | 22 Light calcium carbonate | 0.15 | 40 | 60 | Light calcium carbonate | 0.15 | 51 | 100< | X | X | 28 | 70 | 60< | 3-layer biaxial |

PP: polypropylene homopolymer
PE: high density polyethylene

What is claimed is:

1. A synthetic paper made of a stretched resin film; said stretched resin film being obtained by stretching a resin film having a support layer which comprises:
   (A) from 30 to 80% by weight of said composition of a crystalline polyolefin resin; and
   (B) from 70 to 20% by weight of said composition of milled calcium carbonate particles selected from the group consisting of:
      (b1) milled calcium carbonate particles having an average particle size of from 0.3 to 2 μm prepared by wet-milling 100 parts by weight of calcium carbonate particles in an aqueous medium in the presence of from 0.05 to 2 parts by weight of a dispersant comprising a copolymer of from 10 to 95% by mol of an amine salt selected from the group consisting of diallylamine salts and alkylallylamine salts with from 90 to 5% by mol of an amide selected from the group consisting of acrylamide and methacrylamide, followed by drying; and
      (b2) milled calcium carbonate particles having an average particle size of from 0.3 to 2 μm prepared by wet-milling 100 parts by weight of calcium carbonate particles in an aqueous medium in the presence of from 0.05 to 2 parts by weight of a dispersant comprising a copolymer of from 10 to 95% by mol of an amine salt selected from the group consisting of diallylamine salts and alkylallylamine salts with from 90 to 5% by mol of an amide selected from the group consisting of acrylamide and methacrylamide and then treating the thus milled product in an aqueous medium with 0.5 to 10 parts by weight of a sulfonate selected from the group consisting of sulfonates of alkylene oxide adducts of monohydric alcohols, alkylsulfonates and alkylbenzenesulfonates followed by drying; and wherein said stretching is performed at a temperature lower than the melting point of said crystalline polyolefin resin employed as component (A).

2. The synthetic paper as claimed in claim 1, which has a void ratio of from 10 to 50% as calculated using the following formula:

$$\text{void ratio } (\%) = \frac{\rho_0 - \rho}{\rho_0} \times 100$$

wherein $\rho_0$ represents the density of the resin film before stretching; and $\rho$ represents the density of the stretched resin film.

3. The synthetic paper as claimed in claim 1, wherein said crystalline polyolefin resin is one having a crystallinity of from 10 to 75% and is selected from the group consisting of homopolymers of a-olefins having 2 to 8 carbon atoms and random or block copolymers of 2 to 5 kinds of α-olefins having 2 to 8 carbon atoms.

4. The synthetic paper as claimed in claim 3, wherein said crystalline polyolefin resin is a propylene homopolymer having a melt flow rate, ASTM D1238: 230° C., load 2.16 kg, of from 0.2 to 50 g/10 min.

5. The synthetic paper as claimed in claim 1, wherein said diallylamine salts and alkyldiallylamine salts are diallylamine or alkyldiallylamine salts of acids selected from the group consisting of hydrochloric acid, sulfuric acid, nitric acid and acetic acid.

6. The synthetic paper as claimed in claim 1, wherein said dispersant is a copolymer obtained by reacting diallylamine hydrochloride with acrylamide.

7. The synthetic paper as claimed in claim 1, wherein a dispersion of 10 parts by weight of the milled calcium carbonate (b2) in 100 parts by weight of deionized water shows at 25° C., an electrical conductivity of at least 200 μS/cm.

8. The synthetic paper as claimed in claim 1, wherein said sulfonate of an alkylene oxide adduct of a monohydric alcohol is one represented by the following formula (6):

$$RO(AO)_m SO_3 M \quad (6)$$

wherein R represents an alkyl group having 2 to 18 carbon atoms or an allyl group optionally substituted by an alkyl group having 1 to 10 carbon atoms; A represents an alkylene group having 2 to 4 carbon atoms; M represents Na, K, Li or an ammonium group; and m is a number of from 2 to 20.

9. The synthetic paper as claimed in claim 1, wherein said alkylsulfonate is one represented by the following formula (7):

$$R'—SO_3M \tag{7}$$

wherein R' represents an alkyl group having 6 to 30 carbon atoms; and M represents Na, K, Li or an ammonium group.

10. The synthetic paper as claimed in claim 1, wherein said alkylbenzenesulfonate is one represented by the following formula (8):

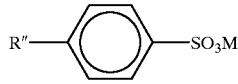
(8)

wherein R" represents an alkyl group having 6 to 23 carbon atoms; and M represents Na, K, Li or an ammonium group.

11. The synthetic paper as claimed in claim 1, wherein said sulfonate is one selected from the group consisting of sodium stearyl polyethylene ether sulfonate, sodium dodecylbenzenesulfonate and sodium alkylsulfonates.

12. The synthetic paper as claimed in claim 1, wherein said dispersant has a weight-average molecular weight of from 1,000 to 1,000,000.

13. An inkjet recording paper made of the synthetic paper as claimed in claim 1, such that when a water color ink, 100% by weight in total, of the following composition is dropped onto the surface thereof, the contact angle of said water color ink to said recording paper is 20 to 42°:

| | |
|---|---|
| C.I. Food Black 2 | 2% by weight, |
| N-methyl-2-pyrrolidone | 10% by weight, |
| diethylene glycol | 20% by weight, |
| polyethylene glycol (m.w.: 200) | 15% by weight, and |
| water | 53% by weight. |

* * * * *